Figure 1:
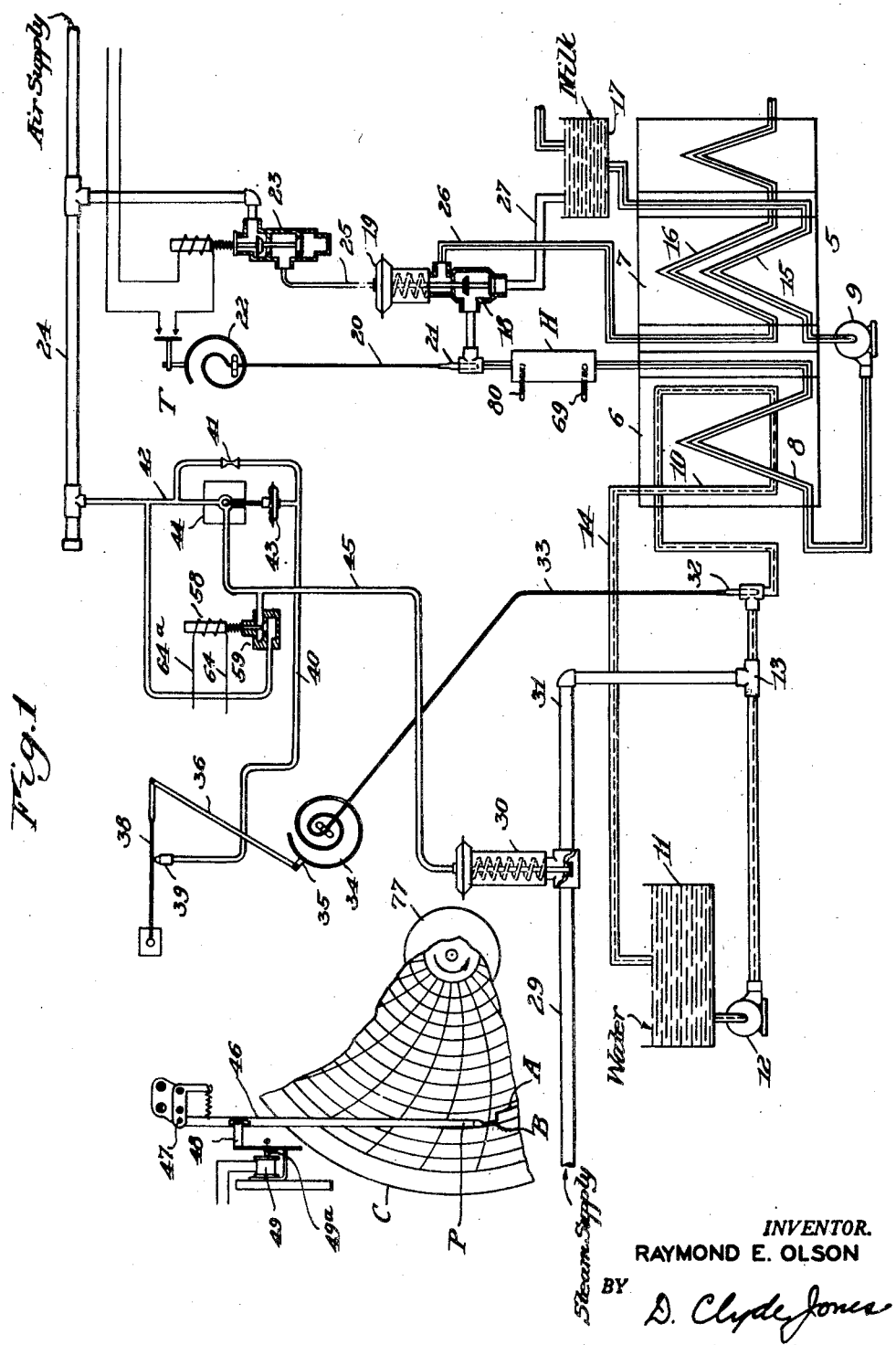

March 28, 1950

R. E. OLSON 2,501,960

METHOD OF AND APPARATUS FOR TIMING THE
HOLDING PERIOD OF PASTEURIZERS

Filed March 21, 1946

2 Sheets-Sheet 1

INVENTOR.
RAYMOND E. OLSON
BY D. Clyde Jones
his Attorney

March 28, 1950 R. E. OLSON 2,501,960
METHOD OF AND APPARATUS FOR TIMING THE
HOLDING PERIOD OF PASTEURIZERS
Filed March 21, 1946 2 Sheets-Sheet 2
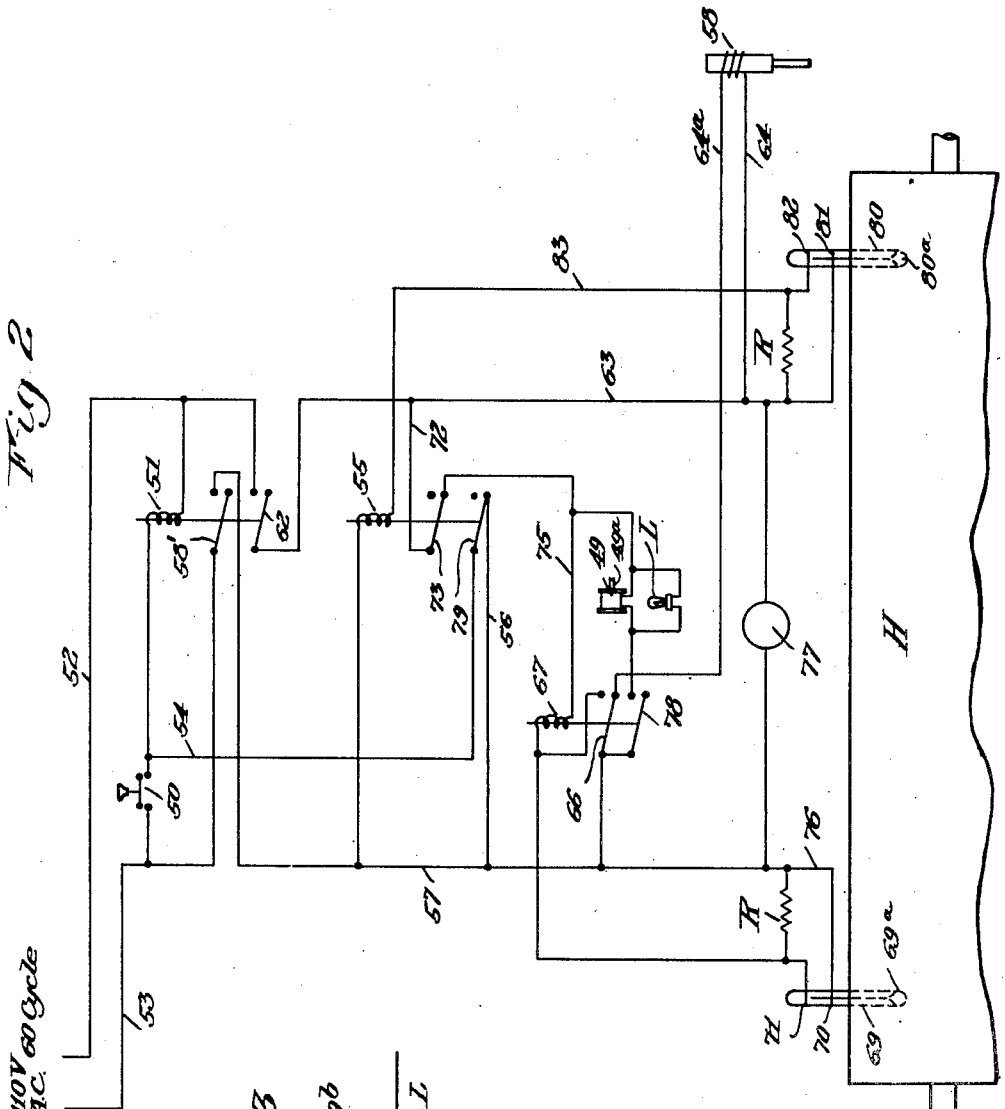
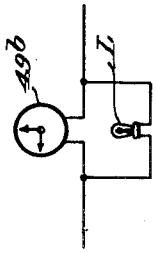
INVENTOR.
RAYMOND E. OLSON
BY D. Clyde Jones
his Attorney Patented Mar. 28, 1950

2,501,960

UNITED STATES PATENT OFFICE 2,501,960

METHOD OF AND APPARATUS FOR TIMING THE HOLDING PERIOD OF PASTEURIZERS

Raymond E. Olson, Pittsford, N. Y., assignor to Taylor Instrument Companies, Rochester, N. Y., a corporation of New York Application March 21, 1946, Serial No. 656,124

7 Claims. (Cl. 161—15)

1

This invention relates to a method of and to apparatus for timing the holding period of a short-time-high temperature pasteurizing system.

In the pasteurizing of milk or similar liquids, it is necessary to hold the liquid at a specified temperature for a minimum given interval of time if the pasteurizing is to be effective. For example, in the so-called short-time pasteurization of milk, the United States Health Code specifies that the milk shall be pasteurized at a minimum temperature of 160° F. for a minimum period of fifteen seconds. In commercial practice, the milk being pasteurized is maintained at 160.5° F. and is held at this temperature for a period of fifteen and one-half to sixteen seconds. The holding period does not mean that the milk flow is actually stopped but instead, the milk is pumped through a tube of such length and at such a rate of flow that the milk is subjected to the required temperature for the specified period. The rate of flow through the pasteurizer is determined by the speed of the pump which advances the milk through the holding portion of the pasteurizer. Consequently, the milk inspector frequently examines the speed of the pump and locks it at that speed of operation which ensures that the milk will not pass through the holding tube in less than the required time, namely, fifteen and one-half seconds.

The present invention has as its main feature a novel method of determining the length of the period required for the pasteurized milk to pass through the holding tube.

Another feature of the invention relates to means by which the inspector automatically and accurately determines the length of time required for the milk to flow through the holding tube whereby the speed of the pump used to advance the milk through the pasteurizer can be accurately determined and the proper adjustment thereof can be effected.

Other features of the invention will appear from the detailed description and claims when taken with the drawings in which Fig. 1 is a diagrammatic showing of a pasteurizing system incorporating the apparatus of the present invention but omitting the electrical circuits thereof; Fig. 2 is a diagrammatic showing of the electrical circuits for use therewith; and Fig. 3 indicates a lapsed time unit which can be substituted for the magnet of the frequency pen in the circuit diagram of Fig. 2.

Since the present invention is directed to a method of and to apparatus for timing the holding period of a short-time-high-temperature pasteurizing system, it is believed that the invention will best be understood by describing such a system and then by describing how this invention is applied thereto.

In the drawings the reference character 5 generally designates a combined pasteurizing unit 6 and a regenerating unit 7. In the pasteurizing unit, the milk or other liquid to be pasteurized, flows through a set of coils or plates 8 in heat exchange relation to a set of heating coils or plates 10 through which there is recirculated, water maintained at a temperature slightly above the pasteurizing temperature. The water recirculating system includes surge tank 11 from which the water is circulated by the pump 12 through a mixing T 13, thence through the heating coils 10 of the pasteurizer and the pipe 14, back to the surge tank.

The regenerative unit includes two sets of coils or plates 15 and 16 in heat exchange relation through one set of which, such as 15, the raw milk from the tank 17 is pumped by the pump 9 to the milk coils or plates 8 of the pasteurizer. The other set of coils or plates 16 of the regenerator conduct the pasteurized milk from the pasteurizer in heat exchange relation to the raw milk in the set of plates or coils 15, thereby serving to cool the pasteurized milk and to partially heat the incoming raw milk. The milk discharged from the pasteurizer coils 8 passes into a suitable holding tube H, where it is held for the required fifteen-second holding interval required in so-called short time pasteurization, and then passes into the flow diversion valve 18.

An electric contact thermometer T, which includes a tube system comprising the sensitive element or bulb 21 communicating with Bourdon spring 22 through capillary 20, controls the flow diversion valve 18. Bulb 21 is positioned in the milk flowing to the inlet of the diversion valve 18. This thermometer is of such construction that when the temperature at the bulb 21 is at or above the predetermined or pasteurizing temperature, the thermosensitive medium in the tube system causes the Bourdon spring 22 of the thermometer to unwind, thereby closing the electrical circuit for operating a solenoid valve 23. This valve, when operated, in turn, supplies compressed air from the supply pipe 24 to the conduit 25 and thence to the motor top 19 of the flow diversion valve 18 for moving the same to its forward flow position. With the valve 18 thus opened, the pasteurized milk from the holding tube H flows through the pipe 26 to the coils or plates 16 of the regenerator unit and thence to a suitable surge tank (not shown), or to a bottling machine (likewise not shown). However, when the milk at the inlet to the diversion valve 18 is below the predetermined pressure, the Bourdon spring 22 of the electric contact controller will wind up to open the above-described circuit of the solenoid valve 23. The valve 23 will be closed in this way to cut-off the supply of compressed air and to exhaust the pressure from the conduit leading to the top of the diversion valve. The spring of this diversion valve then operates to move its valve disks so that the improperly pasteurized milk is diverted through the pipe 27 to the milk supply tank 17. From this tank, the improperly pasteurized milk flows again through the pasteurizer unit 6 for further treatment.

It has been mentioned that the milk in the pasteurizer unit 6 is heated by recirculating water maintained at a temperature slightly above the desired pasteurizing temperature. This recirculating water is heated by steam flowing from the supply pipe 29 through the control valve 30 and pipe 31, and thence through the mixing T 13 into the water recirculating system.

A controller, generally designated C throttles the valve 30 included in the steam line, to maintain the temperature of the circulating water at the desired control temperature or set point. This controller includes a tube system comprising a bulb 32 exposed to the temperature of the recirculating water, which bulb communicates through a capillary tube 33 with a Bourdon spring 34, the tube system being filled with a suitable thermosensitive filling medium well known in the art. The Bourdon spring is provided with a take-off arm 35 to which there is connected one end of a link 36. The other end of this link is connected to the free end of a pivoted baffle 38, to swing the baffle 38 with respect to the nozzle 39. This varies the amount of compressed air that escapes through the nozzle and thereby varies the back pressure of the air in the nozzle. It will be understood that the compressed air is normally supplied to the nozzle through the conduit 40, restriction 41 and conduit 42, from the compressed air supply 24. If the temperature of the water at the bulb 32 is below the desired temperature value, the Bourdon spring 34 will tend to wind up. This movement of the Bourdon spring acts through the link 36 to move the baffle 38 slightly away from the nozzle. The back pressure in the nozzle 39 and the conduit 40 decreases, thereby contracting the capsular diaphragm 43 of the relay valve 44. This opens the relay valve to increase the amount of compressed air supplied from pipe 24 through the conduit 42, relay valve 44 and conduit 45, to the motor top of the control valve 30. This increased pressure in the motor top opens the valve 30 to supply steam in amounts necessary to maintain the temperature of the recirculating water at the set point or control temperature. At the left of Fig. 1 there is illustrated recorder mechanism for recording the length of the period required for milk to pass through the holding tube H. This recorder comprises a clock motor 77 which rotates a chart C at a uniform rate when the circuit of the motor is completed, as will be described. A pen arm 46 suitably pivoted at 47 on the frame of the record, carries a pen P at its lower end to draw a graph on chart C. The pen arm normally positions the pen P so that it will draw an arc A when the chart is rotated. A link 48 connects the free end of the armature 49a on magnet 49, to the pen arm 46. Magnet 49, when it attracts its armature 49a swings the pen arm 46 clockwise to position the pen P, so that it will draw an arc B of greater diameter than arc A, when the chart is rotated.

In accordance with the present invention it is proposed to change momentarily the temperature of the milk flowing through the pasteurizer so that there is a wave of milk at an abnormal temperature passing through the pasteurizer and the holding tube H thereof. In accordance with this method this wave of milk at the abnormal temperature, is used to cause a response at each of two points in the holding tube, of known distance apart and effecting a time measurement as a result of such responses. The means by which this method may be performed is shown for the most part in Fig. 2 of the drawings. In one form of the invention, the wave of milk at an abnormal temperature may be developed as a result of the depression of the push button switch 50 which causes a short opening of the steam valve 30 (Fig. 1), so that the temperature of the circulating water through the pasteurizer is momentarily raised. When the button is depressed, it closes a circuit for relay 51 from one side of the current source (which may be 110 volt, 60 cycle alternating current), conductor 52, winding of relay 51, contacts of the switch 50 and through the conductor 53 to the other side of the current source. The relay 51, when energized, closes a sustaining circuit for itself over the conductor 52, winding of the relay 51, conductor 54, armature and back contact of the relay 55, conductor 56 and 57, front contact of the armature 58' of relay 51, conductor 53 to the other side of the current source. At this time the clock motor 77 which drives the chart (Fig. 1) is connected in parallel of the sustaining circuit of relay 51, which circuit includes conductors 57 and 63. Thus the chart starts to rotate and the frequency pen P will draw an arc A of one diameter. Also, with the relay 51 energized, a circuit is completed for the solenoid 58 of the solenoid valve 59. It will be understood that the opening of the valve 59 temporarily connects the steam line 29 through the pipe 31 to the heating system by the full opening of the valve 30, since this valve will be opened momentarily independently of the action of the relay valve 44 which is temporarily bypassed. The circuit for the solenoid 58 may be traced from one side of the source of current, conductor 52, armature 62 and its front contact, conductors 63 and 64, winding of the solenoid 58, conductor 64a, back contact and armature 66 of relay 67, conductor 57, front contact of the armature 58' of relay 51, conductor 53 to the other side of the current source. The opening of the steam valve 30 in the manner described previously, heats up the water circulating through the heater coils 10 of the pasteurizer and consequently there will be a wave of milk with increased temperature, entering the holding tube H of the pasteurizer. As this wave of milk enters the holding tube, it encounters a bulb 69a of an electric contact thermometer 69. This increased temperature causes the mercury column to rise in the thermometer until it bridges the electrodes 70 and 71 thereof. When these electrodes are thus bridged, a circuit is completed from the current source, conductor 72, armature 73 and back contact of relay 55, conductor 75, winding of the relay 67, through the electrodes 70 and 71 now bridged by the mercury column of the thermometer 69, conductors 76 and 57, armature 58' and front contact of relay 51, conductor 53 to the other side of the current source. The relay 67 is thus energized and at its armature 66 and front contact it closes a self-sustaining circuit for itself independent of the thermometer 69 but extending from armature 66 over conductors 57 to the other side of the current source, as previously described. Simultaneously, relay 67 at its armature 78 and front contact, completes a circuit for energizing the magnet 49 of the frequency pen and the signal L both in multiple with relay 67. Magnet 47 swings the pen arm clockwise so that the pen P describes an arc B of greater diameter than arc A. As soon as the relay 67 is energized to attract its armature 66, it interrupts the circuit including the conductor 64a which energized solenoid 58. The solenoid 58 then permits its valve 59 to close so that the valve 30 in the steam line is now throttled by the temperature controller including the relay valve 44, to maintain the temperature of the recirculating water at the normal required temperature.

Eventually the wave of milk at the abnormal temperature reaches the bulb 80a of electric contact thermometer 80 near the discharge end of the holding tube H. In response to this wave of abnormal temperature, the mercury column in the thermometer 80 bridges the electrodes 81 and 82, to complete a circuit for operating the relay 55. This circuit is traceable from the source of current, conductor 52, front contact and armature 62, conductor 63, electrodes 82 and 81 of thermometer 80, conductor 83, winding of relay 55, conductor 57, front contact and armature 58' of relay 51, conductor 53, to the other side of the current source. Relay 55 when energized, attracts its armatures 73 and 79. At its armature 79 and back contact, relay 55 interrupts the sustaining circuit of the relay 51 which thereupon releases. At the armature 73 and back contact of the relay 55, the sustaining circuit of the relay 67 is interrupted so that it also releases. Relay 67 at its armature 78 and front contact opens the circuit of the magnet 49 which now swings the frequency pen P counterclockwise to a position in readiness to describe an arc A. At the armature 62 and front contact of relay 51, the circuit of the clock 77 is also interrupted thereby stopping the rotation of the chart.

It should be mentioned that a resistor R is connected across the electrodes 70 and 71, while another resistor R is connected across the electrodes 81 and 82. These resistors tend to limit the current flow through the thermometers 69 and 80 thereby reducing arcing which tends to foul the mercury in each thermometer. In addition, the resistors R do not pass sufficient current to energize any of the relays before the electric thermometers 69 and 80 close their circuits.

In a modified form of the invention, the chart and frequency pen P with the magnet 49 can be replaced by a lapsed time indicating device 49b, such as an electric clock. This clock can be substituted for the magnet 49 in the circuit network of Fig. 2 and will measure the time that it takes for a wave of hot milk to travel through the holding tube H from the electric contact thermometer 69 to the electric contact thermometer 80.

While the abnormal temperature has been indicated as a rise in temperature, it may be a drop in temperature resulting from the introduction into the holding tube, of a small amount of pasteurized milk at a subnormal temperature. In the latter case, the thermometers 69 and 80 will be of the type that electrically connect their electrodes 70, 71 and 81, 82, respectively, in response to the subnormal temperature.

I claim:

1. The method of measuring the duration of the heating or cooling period of a liquid flowing at a uniform rate through the passageway of a heat exchanger, said liquid normally having an approximately uniform temperature, which method comprises causing a brief change in the temperature of the liquid, effecting an electrical response due to said temperature change at a first point in said passageway adjacent the inlet thereof, subsequently effecting a second electrical response due to said temperature change at a second point in said passageway remotely located with respect to said inlet and spaced a predetermined distance from said first point, and measuring the lapsed time between said electrical responses.

2. The method of measuring the duration of the heating or cooling period of a liquid flowing at a uniform rate through the passageway associated with a heat exchanger, said liquid normally having an approximately uniform temperature, which method comprises causing a brief change in the temperature of the liquid, sensing said temperature change at a first point in said passageway adjacent the inlet thereof, subsequently sensing said temperature change at a second point in said passageway remotely located with respect to said inlet and spaced a predetermined distance from said first point, making a graph scaled in time units and comprising a circular arc of reference having a given radius and corresponding to the period prior to the temperature change and also comprising a second circular arc having a different radius from the first and corresponding in length to the time interval between the sensing of said temperature change at the first and second points, respectively.

3. In an arrangement for measuring the duration of the heating or cooling period of a liquid being treated at a predetermined temperature in a treating device, the combination with said device including a passageway and means for advancing the liquid through said passageway at a uniform rate, of an electric contact thermometer responsive to a change in temperature of the liquid at one point in said passageway adjacent the inlet thereof, a second electric contact thermometer responsive to change in temperature of the liquid at a second point in said passageway adjacent the outlet thereof and spaced a predetermined distance from said first point, a lapsed time measuring mechanism and an operating circuit for said mechanism completed under the control of said first thermometer and interrupted under the control of said second thermometer.

4. In an arrangement for measuring the duration of the heating period of a liquid being treated at a predetermined temperature, in combination, a heat exchanger comprising a primary passage for a heating liquid and a secondary passage for a liquid to be heated, at least a portion of said secondary passage being in heat exchange relation with said primary passage, means for advancing said liquid through said secondary passage at a uniform speed, a source of heating medium, means responsive to the temperature of said heating liquid for applying said heating medium to said heating liquid in amounts to maintain the temperature thereof at substantially a predetermined value, a pair of electric contact thermometers having bulbs responsive to the temperature of the heated liquid at two points spaced a predetermined distance apart along said secondary passage, manually operated means for rendering said temperature controlled means temporarily ineffective whereby the temperature of the liquid to be heated is changed, means including one of said thermometers for again rendering said temperature controlled means effective whereby the liquid to be heated is maintained substantially at the desired temperature, and a lapsed time measuring mechanism set into operation in response to the closure of said last-mentioned electric contact thermometer and stopped by said other electric contact thermometer.

5. In an arrangement for measuring the duration of the heating period of a liquid being treated at a predetermined temperature, in combination, a heat exchanger comprising a primary passage for a heating liquid and a secondary passage for a liquid to be heated, at least a portion of said secondary passage being in heat exchange relation with said primary passage, means for advancing said liquid through said secondary passage at a uniform speed, a source of heating medium, means responsive to the temperature of said heating liquid for applying said heating medium to said heating liquid in amounts to maintain the temperature thereof at substantially a predetermined value, a pair of electric contact thermometers having bulbs responsive to the temperature of the heated liquid at two points spaced a predetermined distance apart along said secondary passage, manually operated means for establishing a by-pass to supply said heating medium directly to said heated liquid independently of said temperature controlled means whereby the temperature of the liquid to be heated is changed, means including one of said thermometers for disestablishing said by-pass and again rendering said temperature controlled means effective whereby the liquid to be heated is maintained substantially at the desired temperature, and a lapsed time measuring mechanism set into operation in response to the closure of said last-mentioned electric contact thermometer and stopped by said other electric contact thermometer.

6. Apparatus for measuring the time required for a charge to flow from one location to another in a conduit, comprising temperature-responsive means adapted to be positioned at the first location, other temperature-responsive means adapted to be positioned at the second location, recording means comprising relatively movable pen and chart elements, electrical means for actuating one of said elements, means controlled by the first temperature-responsive means in response to a change in temperature of said charge at said first location for effecting a change in current flow through said electrical means, and means controlled by the second temperature-responsive means in response to a change in temperature at the second location for effecting a further change in current flow through said electrical means.

7. Apparatus for measuring the time required for a charge to flow from one location to another in a conduit, comprising temperature-responsive means adapted to be positioned at the first location, other temperature - responsive means adapted to be positioned at the second location, timing means, means controlled by the first temperature-responsive means for bringing said timing means into operation, and means controlled by the second temperature-responsive means for terminating the timing action of said timing means.

RAYMOND E. OLSON.

REFERENCES CITED

The following references are of record in the file of this patent:

UNITED STATES PATENTS

| Number | Name | Date |
|---|---|---|
| 1,222,492 | Thomas | Apr. 10, 1917 |
| 1,245,688 | Crewson | Nov. 6, 1917 |
| 1,614,702 | Wilson | Jan. 18, 1927 |
| 1,616,481 | Allen | Feb. 8, 1927 |
| 2,353,382 | Barrett | July 11, 1944 |